J. K. & E. M. SMITH.
DIGGER.
APPLICATION FILED SEPT. 14, 1909.
969,569.
Patented Sept. 6, 1910.
4 SHEETS—SHEET 1.
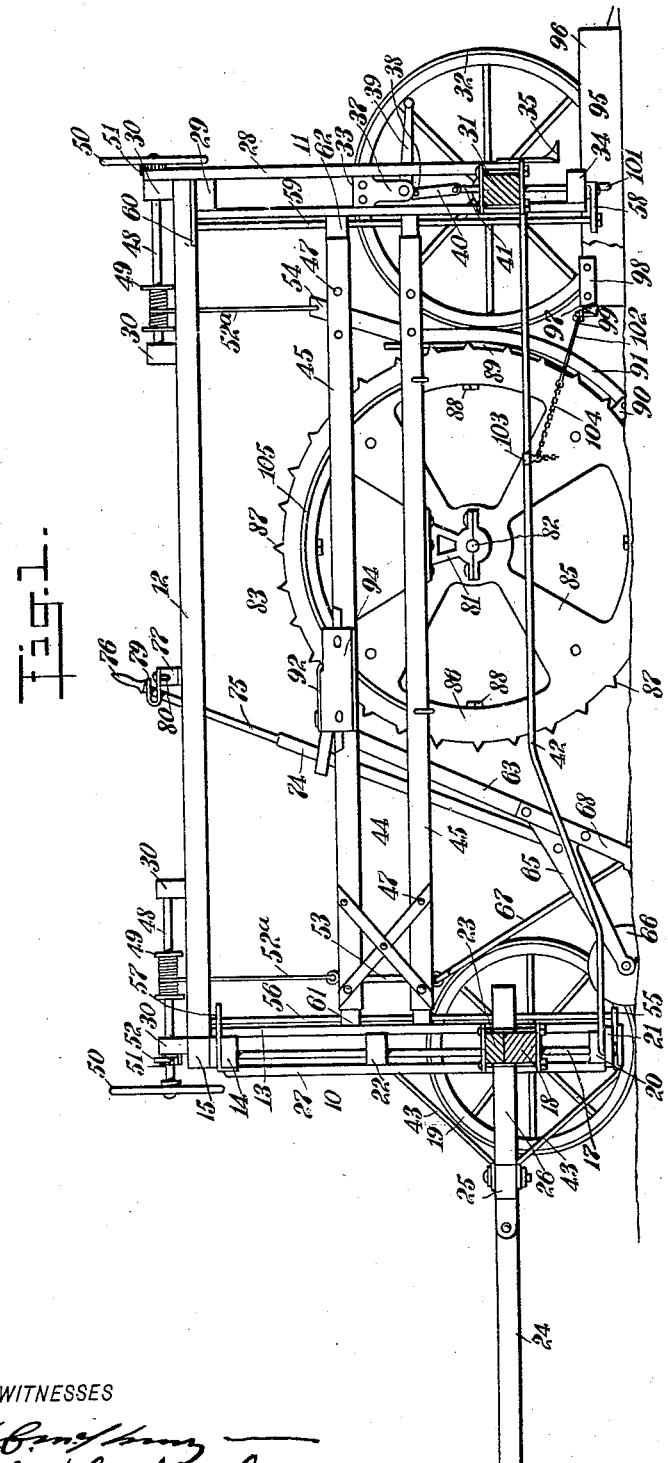
WITNESSES
INVENTORS
James K. Smith
Edward M. Smith
BY
Munn & Co
ATTORNEYS

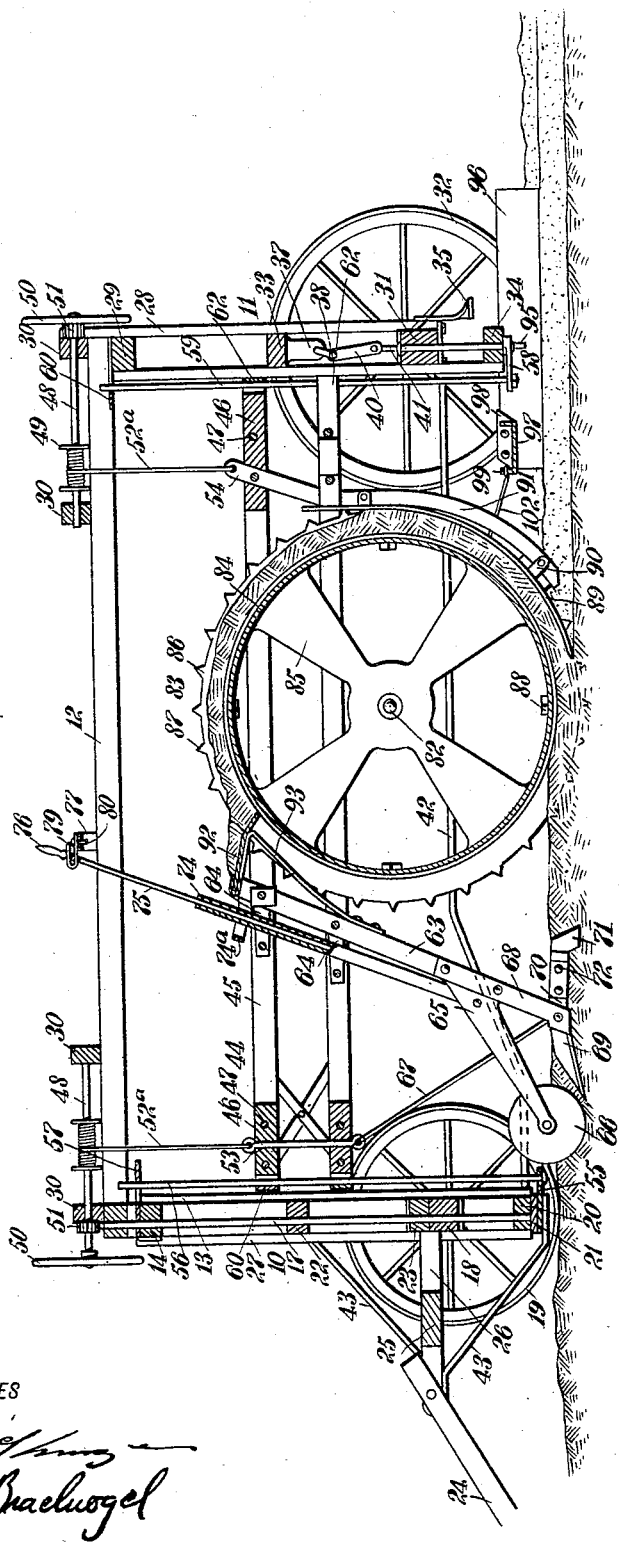

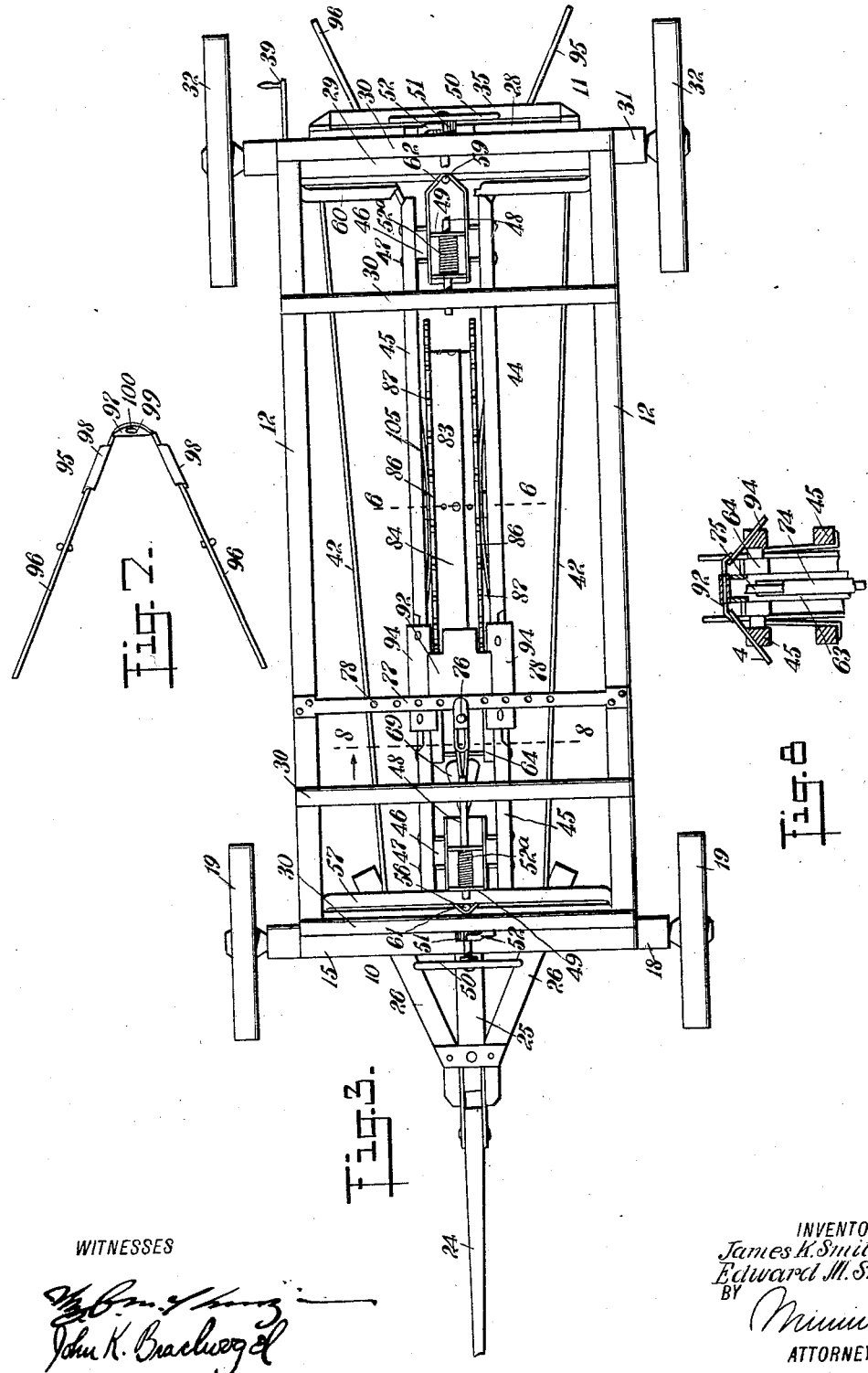

J. K. & E. M. SMITH.
DIGGER.
APPLICATION FILED SEPT. 14, 1909.
969,569.
Patented Sept. 6, 1910.
4 SHEETS—SHEET 4.
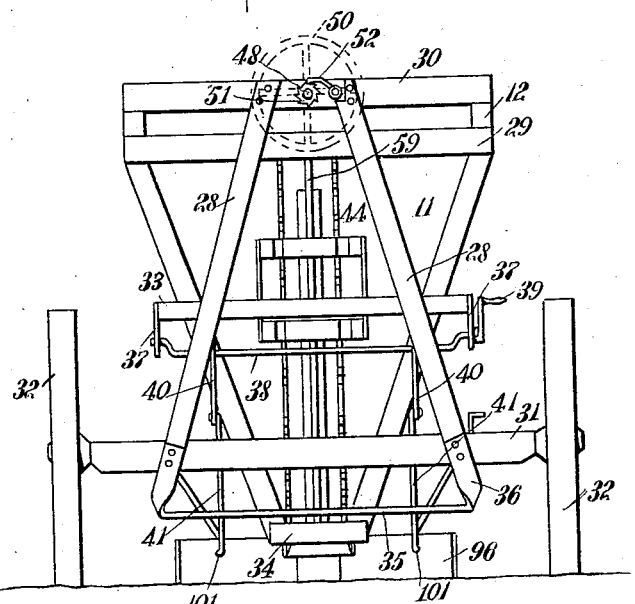
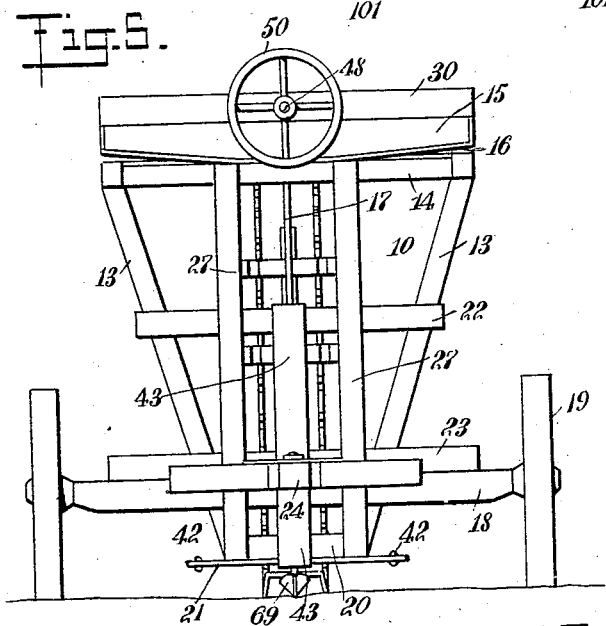
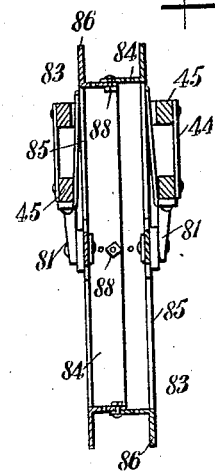
WITNESSES
INVENTORS
James K. Smith
Edward M. Smith
BY
ATTORNEYS

UNITED STATES PATENT OFFICE.

JAMES K. SMITH AND EDWARD M. SMITH, OF SPENCER, INDIANA.

DIGGER.

969,569.

Specification of Letters Patent. Patented Sept. 6, 1910.

Application filed September 14, 1909. Serial No. 517,579.

*To all whom it may concern:*

Be it known that we, JAMES K. SMITH and EDWARD M. SMITH, citizens of the United States, and both residents of Spencer, in the county of Owen and State of Indiana, have invented a new and Improved Digger, of which the following is a full, clear, and exact description.

This invention relates to diggers for forming drain ditches or other excavations, or for harvesting tuberous plants, and relates more particularly to a machine of this class which comprises a carriage adapted to be propelled in any suitable way along the ground, a frame adjustably mounted upon the carriage, a plow carried by the frame, for breaking the earth, and an earth hoisting member for removing the earth loosened by the plow, the member being operable by the rolling contact thereof with the ground.

The object of the invention is to provide a strong and efficient digger for various agricultural and other purposes, which is simple in operation, which can be adjusted so that drains or ditches of different dimensions can be formed thereby, which can be used for harvesting potatoes, beets and other tuberous plants, and which can be employed in filling ditches or other openings in the ground.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of an embodiment of our invention, showing the frame, the plow, and the earth hoisting member in side elevation; Fig. 2 is a similar view showing the frame and the earth hoisting member in longitudinal section; Fig. 3 is a plan view of the digger; Fig. 4 is a rear elevation of the digger; Fig. 5 is a front elevation of the digger; Fig. 6 is a transverse section on the line 6—6 of Fig. 3, of the frame and of the earth hoisting member; Fig. 7 is a plan view of an attachment employed in connection with the digger, for putting aside the loosened earth or, when reversed, for filling ditches; Fig. 8 is a transverse section on the line 8—8 of Fig. 3; and Fig. 9 is a transverse section showing the plow and indicating the adjustability of the parts thereof in dotted outline.

Before proceeding to a more detailed explanation of our invention, it should be clearly understood that while in the accompanying drawings we have illustrated, for example, an embodiment of the device which is adapted to be propelled by means of draft animals, the carriage can be advanced upon the ground in any other suitable manner, for example, by hitching the digger to a traction engine. It will be seen that while it is peculiarly useful for narrow drain ditches or irrigating furrows, in certain agricultural pursuits, the digger can also be used for other purposes wherein it is necessary to employ ditches or channels in the ground. At the same time, the device can be used for removing from the earth or loosening therein, tuberous plants such as potatoes, beets or the like, which are planted in comparatively straight rows. As will appear more clearly hereinafter, the device is adjustable to regulate not only the depth of the ditch, but as well, the width. Furthermore, the adjustability is such that it can be used in harvesting plants, the roots of which grow at different depths. We provide a special device in connection with the hoisting wheel or member, which permits the digger to be successfully employed even in loose and friable earth, and which renders the operation of the hoisting wheel positive and certain.

Referring more particularly to the drawings, we employ a carriage which has a forward truck 10 and a rear truck 11 joined by longitudinal body members 12 consisting of wooden beams or the like. The forward truck 10 has side members 13 connected at the upper ends by a cross piece 14 upon which rests a bolster 15, joining the members 12. The bolster 15 has a metal bearing strap 16 at the under side and is tapered from the center to the ends. A king bolt 17 serves to secure the bolster 15 pivotally with respect to the forward truck, which includes an axle beam 18 through which the king bolt passes. The axle beam at the ends has axle spindles upon which the front wheels 19 are mounted. The side members 13 at the lower ends have a connecting member 20 at which the king bolt terminates, and which has thereunder a supporting strip 21 the ends of which are extended.

The truck includes a cross-bar 22 connecting the side members 13, and a beam 23 positioned upon the axle beam 18. A draft tongue 24 is pivoted between the sides of a bifurcated stub tongue 25 which in turn is secured between two mutually inclined draw bars 26 mounted between the axle beam and the beam 23, which have cut-away parts to receive the draw bars. The stub tongue has inclined bracing members 43 extending to the truck. The latter has uprights 27 secured to the member 20, the beams, and the member 14, to strengthen the truck.

The rear truck comprises pairs of mutually inclined members 28, the upper ends of one pair of which are connected by a cross-piece 29 upon which are secured the rear ends of the members 12. The second cross-piece 30 rests upon the rear ends of the members 12 and has the upper ends of the other members 28 secured thereto. The rear truck has an axle beam 31 having at the extremities, axle spindles by means of which the rear wheels are mounted in position. An intermediate cross-bar 33 is located between the corresponding members 28. The lower ends of one pair of the members 28 are connected by a cross-piece 34, while the lower ends of the other members 28, that is, the lower ends which are farther apart, are connected by a strip 35 of metal having upwardly disposed ends 36 riveted or otherwise secured to the members 28.

The cross-piece 33 has hangers 37 in which is journaled a crank shaft 38 having at one end a hand crank 39 by means of which it can be manipulated. Links 40 are pivotally mounted upon the crank shaft and at the lower ends have depending therefrom hook rods 41, for a purpose which will appear more clearly hereinafter, and passing through suitable openings in the axle beam. The trucks at their lower ends are joined by reach rods 42 which extend from the rear axle beam to the member 21. The forward ends of the reach rods 42 are downwardly disposed, as is shown most clearly in Fig. 2.

We employ a frame 44 consisting of pairs of spaced longitudinal members 45 having therebetween at the ends, connecting members or blocks 46 through which pass securing bolts 47 or the like. The members 12 carry further cross-pieces 30 which are arranged in pairs transversely of the carriage, at the front and the rear thereof, and have journaled in suitable openings, shafts 48, each of which has a spool or drum 49, and which are controlled by hand wheels 50. They have ratchets 51 adapted to be engaged by dogs 52 to hold the shafts against rotation in one direction. Lines 52$^a$, consisting of any suitable flexible members are wound upon the drums 49 and have depending ends secured respectively to a vertical eye-bolt 53 connecting the forward blocks 46 of the frame, and a post 54 positioned at the rear end of the frame between the sides thereof, as is shown most clearly in Fig. 2. It will be seen that by means of the manually controllable shafts, the frame can be raised or lowered for purposes of adjustment necessary in the operation of the digger.

The front truck has a rearwardly projecting bracket 55 which at the lower end carries a substantially vertical guide rod 56. At the top, the truck has a rearwardly spaced retaining bar 57 which engages the upper end of the guide rod to hold the same movably in position. The rear truck at the lower end has a forwardly extending bracket 58 which carries a guide rod 59 similar to the guide rod 56. At the upper end, the truck has a corresponding retaining bar 60. At the ends, the frame has eyes 61 and 62 which slidably receive the guide rods 56 and 59, to regulate the upward and downward movement of the frame.

The plow beam 63 is positioned between the side members of the frame and is held in place by means of suitable yokes 64. It has at the lower end a forwardly and downwardly projecting arm 65 having at the free ends a furow opening roller or colter 66 of any suitable form. A bracing link 67 joins the arm and the lower end of the eye bolt 53. At the lower end the plow beam has a bifurcated member 68 which carries the plow share 69. The shank 70 of the plow share projects rearwardly and has outwardly disposed side, cutter wings 71 secured thereto, by means of bolts 72. Spacers 73 are positioned between the shank of the plow share and the cutter wings to regulate the distance between the wings. By employing spacers of different thicknesses the distance between the wings can be adjusted to regulate the width of the ditch. It will be understood that these cutter wings form the sides of the ditch, while the plow proper, following the colter, loosens the earth.

The plow has associated therewith a pivoted, tubular member 74 preferably secured to the arm and having therein a rod 75, so that the whole constitutes a telescopic member having at the upper end a grip 76. A bridge 77 provided with a plurality of openings 78, extends across the carriage. The rod 75 has a bracket 79, provided with a pin 80 adapted to be received by any one of the openings 78. In this way the plow, together with the frame which carries it, can be held in a plurality of adjustments against lateral movement. A U-shaped stop 74$^a$ limits the movement of the member 74.

Rearwardly of the plow beam, the frame has hangers 81 in which are journaled spindles 82 carrying the hoisting wheel 83. The latter comprises similar members each consisting of a rim 84, spokes 85, and a radially extended, peripheral flange 86 having a plurality of teeth 87 at the outer edge. The members are assembled by means of bolts 88 passing through suitable, registering openings of the rims. By providing a number of openings, the width of the hoisting wheel, that is the distance between the radial flanges 86 can be regulated in accordance with the width of the ditch to be formed. It will be remembered that the side cutter wings of the plow can be correspondingly adjusted. The teeth of the hoisting wheel insure that it revolves as the carriage is propelled along the ground, the loosened earth being held between the flanges and carried upward with the wheel, as is shown most clearly in Fig. 2. An earth retainer 89, consisting of a suitably curved strip or plate is arranged between the flanges 86 at the rear of the wheel, and is fastened by means of brackets 90 upon a suitably formed extension 91 of the post 54. The retainer prevents the earth from falling from the hoisting member and packs it so that it is carried upward until it is dislodged by an earth remover or scraper 92 mounted by means of a suitable bracket 93 upon the upper end of the plow beam. At each side of the remover or scraper, the frame carries downwardly inclined tables 94 over which the earth falls and which direct the earth to the sides of the ditch.

We employ in connection with our digger a drag 95 consisting of sides 96 inclined with respect to each other and joined at their nearer ends by a head 97 having parts 98 folded upon themselves to receive the ends of the sides 96 therebetween and to which they are bolted. The head has an upwardly disposed extension 99 provided with an opening 100 therethrough. The sides have openings 101 which receive the laterally disposed extremities of the hook rods 41, the head in this position of the drag being connected by means of links 102 with the reach bars 42. The latter have suitable clamps 103, which are secured to chain extensions 104 of the links. It will be understood that the drag thus follows behind the hoisting wheel and pushes to both sides the earth which falls from the tables 94, to remove the same a material distance from the sides of the ditch.

By reversing the drag so that the spaced ends of the sides are at the front, it can be employed for filling in ditches, that is, for forcing the earth lying alongside of the same into the ditches. When it is employed for this purpose the drag is secured by means of links to the draw bars, the links being suitably fastened at the openings 101.

At the inside of the longitudinal members, the frame has resilient, curved members 105 which engage frictionally at the sides of the hoisting wheel and serve to position it centrally with respect to the frame. These springs 105 at the same time serve to remove any earth adhering at the outside of the flanges 86.

The drag, it will be understood, can be raised and lowered as desired, owing to the provision of the crank shaft 38 and the parts associated therewith.

Having thus described our invention, we claim as new, and desire to secure by Letters Patent:

1. A digger, comprising a carriage, a frame mounted thereon and adjustable in a substantially vertical direction, a plow carried by said frame, an earth-hoisting wheel journaled upon said frame rearwardly of said plow and operable by the rolling contact thereof with the ground, and means for removing the earth from said wheel.

2. A digger, comprising a carriage, a frame mounted thereon and adjustable in a plurality of directions, a plow carried by said frame, an earth-hoisting wheel journaled upon said frame, an earth retainer and packer associated with said wheel, means for removing the earth from said wheel, and means for raising and lowering said frame, said plow being positioned in advance of said wheel and being independent thereof.

3. A digger, comprising a carriage, an earth loosening member carried thereby, and a rotatable earth hoisting member carried thereby rearwardly of said first member, said earth-hoisting member being continuously operable by the rolling contact thereof with the ground, said earth-loosening member and said earth-hoisting member being independent of one another.

4. A digger, comprising a carriage, an adjustable frame mounted upon said carriage, a plow carried by said frame and comprising an earth-loosening plow share and spaced cutter wings, and an earth-hoisting member carried by said frame at the rear of said plow and operable by the movement of the carriage.

5. A digger, comprising a carriage, an adjustable frame mounted upon said carriage, a plow carried by said frame and comprising an earth-loosening plow share and spaced, side, cutter wings, and a continuously rotatable earth-hoisting wheel carried by said frame at the rear of said plow, said wheel being operable by the rolling contact thereof with the ground, said frame being adapted to be raised and lowered.

6. A digger, comprising a carriage, an adjustable frame mounted thereon, a plow carried by said frame and comprising an earth-loosening plow share and spaced, side, cutter wings, a continuously movable earth-hoisting member carried by said frame at the rear of said plow, a scraper for removing the earth from said earth-hoisting member, and a table arranged to receive the earth from said member and to direct the same in a predetermined direction.

7. A digger, comprising a carriage, a frame mounted upon said carriage, a rotatable earth-hoisting member journaled upon said frame and operable by the rolling contact thereof with the ground, said member having adjustable earth-engaging flanges, a curved earth-retainer carried by said frame at the rear of said hoisting member, a scraper for removing the earth carried by said member, and tables mounted upon each side of said scraper and adapted to receive the earth removed from said member by said scraper and to direct earth to the opposite sides of the device.

8. A digger, comprising a carriage, a frame adjustably mounted upon said carriage, a plow beam secured to said frame and having a plow share and side, cutter wings adjustably spaced, said beam having an arm carrying a colter, an earth-hoisting wheel journaled upon said frame and having spaced radial flanges provided with teeth, a curved earth-retaining member carried by said frame and positioned at the rear side of said wheel between said flanges, a scraper carried by said frame and coöperating with said wheel at the upper portion thereof to free it from earth, tables carried by said frame at each side of said scraper and downwardly and laterally inclined, and means for holding said frame in a plurality of adjustments.

9. A digger, having a plow provided with adjustable spaced cutter wings, and an earth-hoisting wheel having adjustably spaced radial flanges.

10. In a digger, a plow beam, a plow share secured to said beam and having a shank, side, cutter wings carried by said shank and extending rearwardly and laterally therefrom, means for adjustably holding said wings in position, and removable spacing members between said wings and said shank.

11. In a digger, a frame, a plow beam adjustably carried by said frame, an arm rigid with said beam and projecting forwardly therefrom, a colter carried by said arm, a plow share secured to said beam and having a rearwardly extending shank, side, cutter wings having blades rearwardly and laterally offset, bolts removably securing said wings to said shank, and removable spacing blocks at both sides of said shank between said wings.

12. In a digger, an earth-hoisting wheel having rims, spokes rigid with said rims, radially extending flanges rigid with said rims, and means for adjustably securing said rims together.

13. In a digger, an earth-hoisting wheel comprising members each having a rim, spokes rigid therewith, a peripheral, radial flange rigid with each of said rims, said flanges having peripheral teeth, and bolts for adjustably securing said rims together, whereby the distance between said flanges can be varied.

14. In a digger, the combination with an earth-hoisting wheel having adjustably spaced flanges, of a curved earth-retainer and packer positioned between said flanges at the rear of said wheel, a scraper having a part located between said flanges to remove the earth carried by said wheel, and means at each side of said scraper for directing the earth passing over the same.

15. In a digger, a carriage, a frame mounted upon said carriage and adapted to be raised and lowered, said frame having a limited lateral movement, means for locking said frame against lateral movement, a plow carried by said frame, and an earth-hoisting member carried by said frame.

16. A digger, comprising a carriage, a frame, means for raising and lowering said frame, said frame having a limited lateral movement, means for locking said frame against lateral movement, a plow carried by said frame, an earth-hoisting member carried by said frame, an earth-retainer and packer associated with said earth-hoisting member and carried by said frame, and means carried by said frame for removing the earth hoisted by said member, said means for raising and lowering said frame comprising rotatable drums, lines wound thereon and secured to said frame, and means for holding said drums against rotation in one direction.

17. In a digger, a carriage having trucks, each of said trucks having a substantially vertical rod movably held at the lower end thereof, a frame having a guiding connection with said rods, a plow carried by said frame, retaining bars controlling the free ends of said rods, means for raising and lowering said frame, and means for holding said frame against lateral movement.

18. In a digger, a carriage, a frame adapted to be raised and lowered and having a limited lateral movement, a plow beam carried by said frame and having a plow share, and a telescopic member secured to said beam and having means for holding said frame locked against lateral movement.

19. In a digger, a carriage, a frame carried thereby and adapted to be raised and lowered, a plow beam rigid with said frame and having a plow share, a telescopic member secured to said beam and having a bracket, and a bridge mounted upon said carriage and adapted to be engaged by said bracket to hold said frame in a plurality of positions.

20. In a digger, a carriage having a crank shaft, hangers depending from said shaft, and a drag adapted to have said hangers removably secured thereto and having means whereby it can be removably attached to said carriage.

In testimony whereof we have signed our names to this specification in the presence of two subscribing witnesses.

JAMES K. SMITH.
EDWARD M. SMITH.

Witnesses:
GURD SNOBER,
THOMAS M. FRANKLIN.